United States Patent [19]

Sly et al.

[11] 4,300,645

[45] Nov. 17, 1981

[54] WEIGHING SCALE FOR SMALL LOADS

[76] Inventors: Eugene L. Sly, P.O. Box 19545, Portland, Oreg. 97219; David C. English, 3822-59th Ave., SW., Seattle, Wash. 98116

[21] Appl. No.: 82,620

[22] Filed: Oct. 9, 1979

[51] Int. Cl.³ .............................................. G01G 3/08
[52] U.S. Cl. .................................... 177/211; 177/229
[58] Field of Search ...................... 177/211, 229, 255; 73/141 A, 862.5

[56] References Cited

U.S. PATENT DOCUMENTS

| | | | |
|---|---|---|---|
| 3,047,084 | 7/1962 | Vogel | 177/229 |
| 3,788,411 | 1/1974 | Oxley | 177/211 |
| 3,807,517 | 4/1974 | Freeman | 177/229 X |
| 4,091,885 | 5/1978 | Oxley | 177/211 X |
| 4,128,001 | 12/1978 | Marks | 73/141 A X |

*Primary Examiner*—Joseph W. Hartary
*Attorney, Agent, or Firm*—Oliver D. Olson

[57] ABSTRACT

An elongated bending beam and an elongated flexure strap are supported in substantially parallel, spaced-apart relationship by end cantilever blocks one of which is secured to a scale base and the other of which mounts a food receiving platform for movement vertically with respect to the scale base. First and second pairs of matched strain sensing resistors are bonded to the opposite faces of the bending beam adjacent the opposite ends thereof and are connected electrically to form a balanced Wheatstone bridge, the output voltage of which is utilized to operate a digital read-out unit for indicating the weight of a small portion of sliced food deposited upon the scale platform from a food slicer, and is also utilized to turn off the food slicer when the desired weight of food is deposited on the scale platform.

8 Claims, 5 Drawing Figures

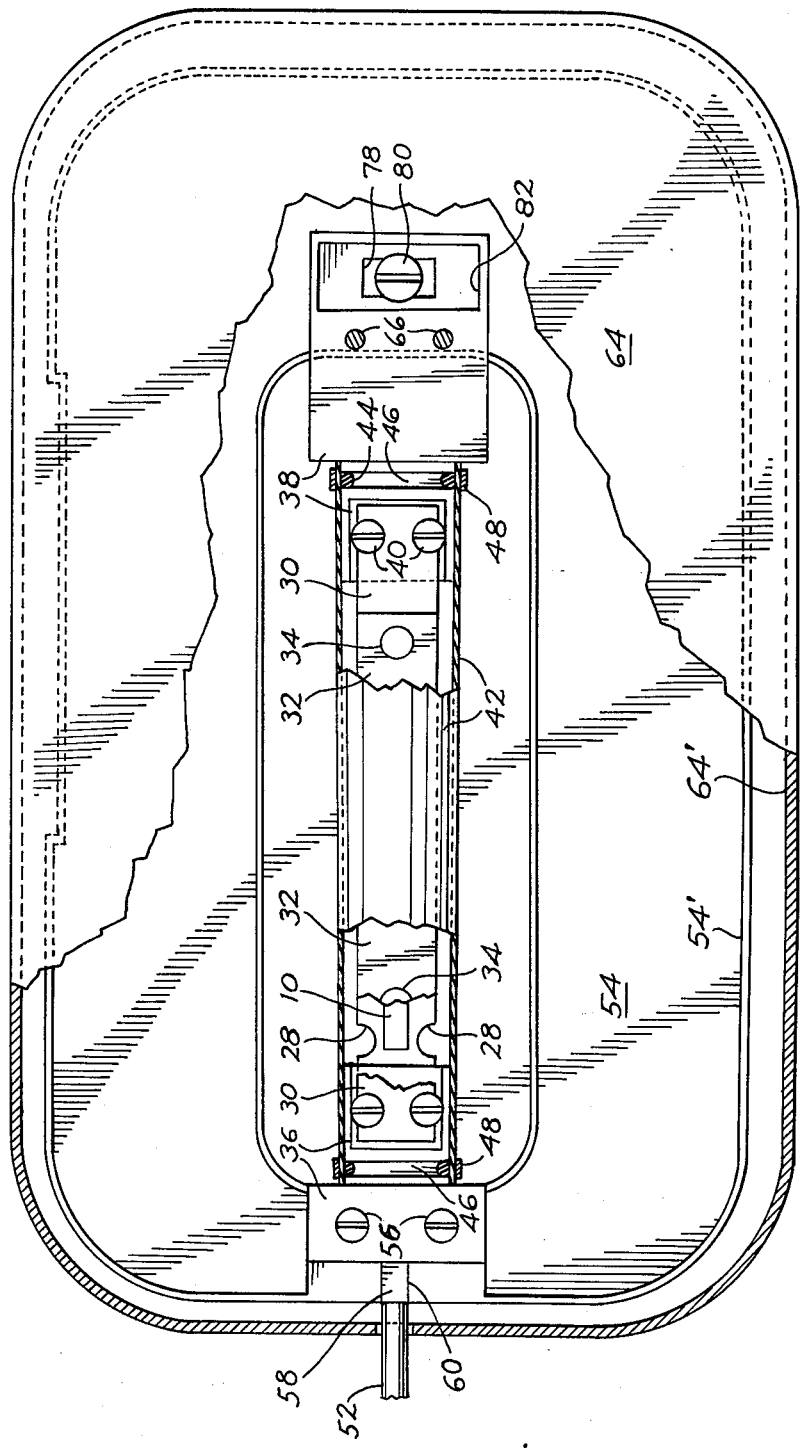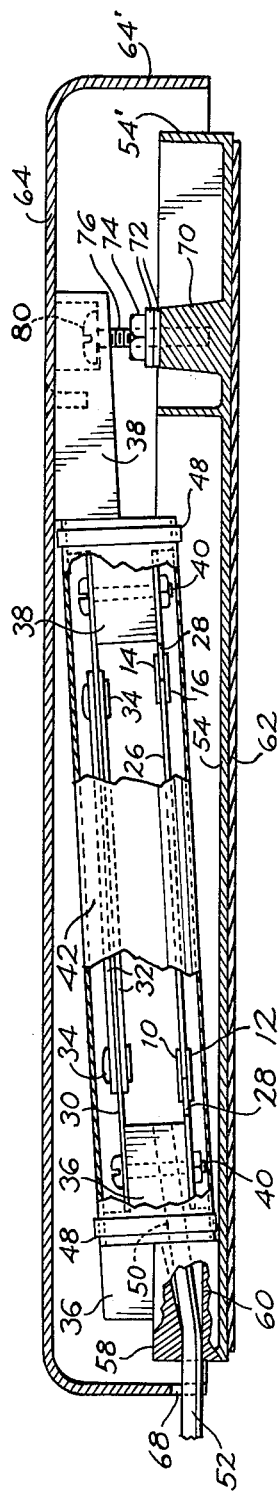

WEIGHING SCALE FOR SMALL LOADS

BACKGROUND OF THE INVENTION

This invention relates to load weighing devices, and more particularly to a weighing scale for receiving and measuring small portions of food products delivered by gravity from a food slicing, grinding, grating, or other processing device by which food products are reduced to smaller size pieces.

Scales for weighing small portions of sliced meats and other food produce have been provided heretofore. One such scale is described in U.S. Pat. No. 3,938,602 issued to Eugene L. Sly, one of the inventors herein. The structure of that scale is such that it required a housing of such height that it cannot be placed upon the food receiving platform of conventional manual or automatic food slicers. Accordingly, the housing must be placed on the work counter adjacent the slicer, thereby taking up valuable counter space.

Further, the various conventional food slicers have integral food receiving platforms of diverse sizes and shapes located at diverse elevations above a work counter. It is necessary, therefore, that auxiliary legs of various heights be provided for removable attachment to such slicers, or to the scale housing, so as to orient the food receiving platform of the scale at proper elevation to receive food slices deposited thereon during operation of the slicer.

Additionally, the scale must be provided with interchangeable food receiving platforms of diverse dimensions in order that it may be placed in required position to receive the food slices directly from the slicer. Because of this requirement, the scale must be readjusted for each scale platform in order to insure accurate weight measurements.

The foregoing factors complicate incorporation of the scale with conventional slicers and contribute to inaccuracies in weighing food portions processed by different slicers.

Still further, the weighing mechanism of the scale described in the patent identified hereinbefore involves the movement of a scale pointer relative to a photoelectric beam to control the operation of a food slicer. This is a complex and costly arrangement, is slow in reaching stable read-out conditions even though damping mechanism is provided, requires considerable maintenance of the many moving parts, and is subject to damage by the inadvertent dropping of heavy food pieces or other objects onto the receiving platform.

Although other weighing systems, including those utilizing strain gauges, overcome some of the problems associated with the aforementioned pointer and photoelectric beam arrangement, none of them heretofore has been adapted for use directly on the food receiving platform of a conventional food slicer or other food processor. Indeed, they have not been able to weigh loads of less than about five pounds.

SUMMARY OF THE INVENTION

In its basic concept, the weighing scale of this invention utilizes a bending beam having strain sensing resistors mounted thereon in pairs on opposite faces of the beam adjacent opposite ends thereof, the beam being supported in such manner that the magnitudes of sensed tension and compression at the locations of the resistors at the opposite ends of the beam are substantially equal over the operating range of the beam.

It is by virtue of the foregoing basic concept that the principal objective of this invention is achieved; namely, to overcome the disadvantages and limitations of the weighing scale of U.S. Pat. No. 3,938,602 previously mentioned.

Another object of this invention is to provide a weighing scale of the class described which is of sufficiently low profile as to enable its mounting directly on the food receiving platform of a food slicer.

Still another object of this invention is the provision of a weighing scale of the class described which is capable of weighing food portions and other loads as small as 0.1 ounce.

A further object of this invention is the provision of a weighing scale of the class described which achieves stable weight measuring condition in a minimum of time.

A still further object of this invention is to provide a weighing scale of the class described which is constructed to avoid damage to its components and the associated electrical control components due to shock overloading, as by dropping heavy objects on the receiving platform.

Another object of this invention is the provision of a weighing scale of the class described in which is substantially eliminated weight measurement errors due to deposit of food portions or other objects at random locations on the receiving platform.

A further object of this invention is the provision of a weighing scale of the class described in which the strain sensing assembly is sealed hermetically while still affording accurate measurements of weights as small as 0.1 ounce.

A still further object of this invention is to provide a weighing scale of the class described which is of simplified construction for economical manufacture, provides precise and reproducible measurements over a long operating life, with minimum maintenance and repair.

The foregoing and other objects and advantages of this invention will appear from the following detailed description, taken in connection with the accompanying drawings of a preferred embodiment.

BRIEF DESCRIPTION OF THE DRAWINGS

FIG. 1 is a side elevation of a weighing scale embodying the features of this invention, the same being shown in substantially full scale with parts being broken away and in section to disclose structural details, a removable food receiving tray being shown in broken lines.

FIG. 2 is a plan view of the weighing scale of FIG. 1, the food receiving platform and tray being shown in broken lines and other portions being broken away to disclose structural details.

DESCRIPTION OF THE PREFERRED EMBODIMENT

The scale of this invention employs a bending beam provided with electric strain sensing means which produces electric comparison signals utilized to operate an indicator of the weight measured and also to control operation of mechanism which delivers objects to the scale for weight measurement.

Figure 3:
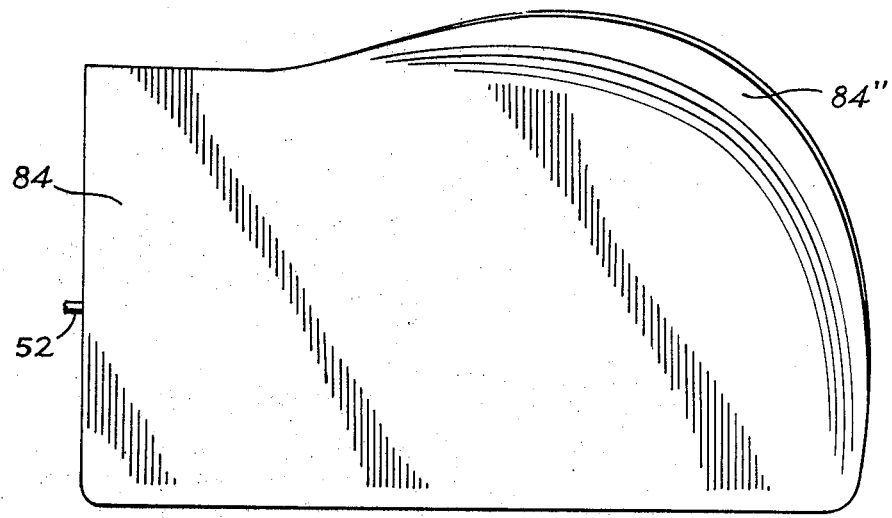
FIG. 3 is a plan view of the weighing scale of FIGS. 1 and 2 on a reduced scale.
Figure 4:
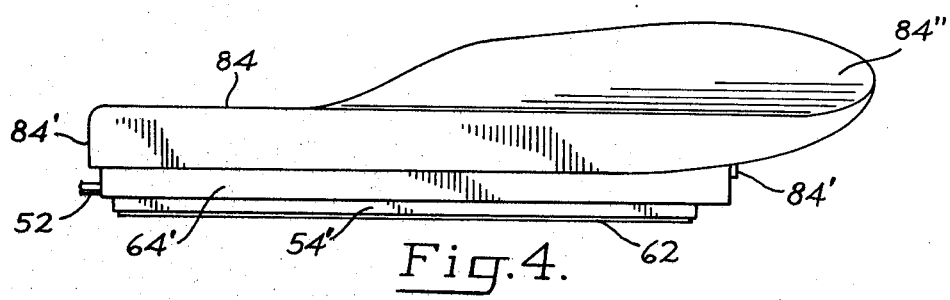
FIG. 4 is a side elevation of the weighing scale as viewed from the bottom in FIG. 3.
Figure 5:
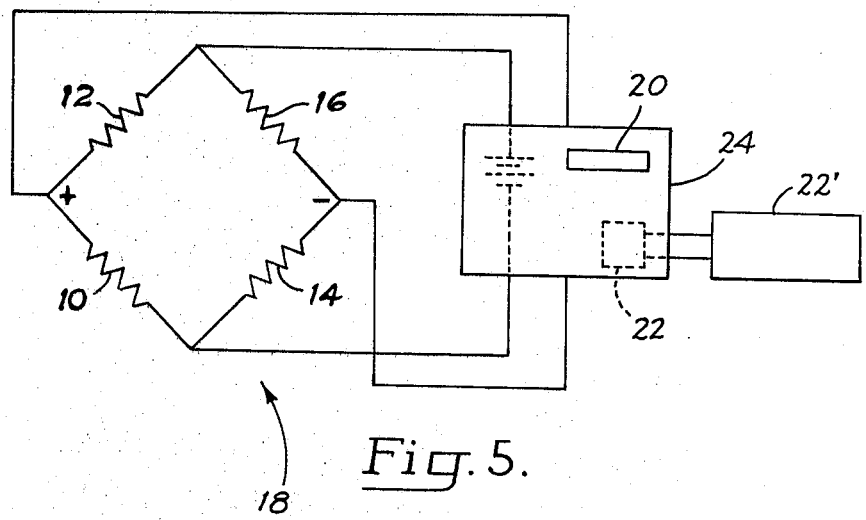
FIG. 5 is a schematic diagram of an electric circuit associating the electrical components of the weighing scale of this invention with read-out and processor control components of a complete weighing system.

In the specific embodiment illustrated schematically in FIG. 5, the substantially matched resistors 10, 12, 14 and 16 are associated with a bending beam, described hereinafter, and connected together to form a balanced Wheatstone bridge 18. As is well known, bending of the beam upsets the balance of the bridge to a corresponding degree, producing an output voltage. For the purpose of this invention, this output voltage functions to operate a digital read-out unit 20 which provides an indication of the weight of the load which caused the bending of the beam. In addition, the output voltage is applied to a controller 22 for a food slicer 22' or other food processor, to deactivate the latter when the desired weight of food has been deposited on a receiving platform supported by the bending beam. The source of electric potential for the Wheatstone bridge and associated circuitry, as well as the digital read-out unit 20 and controller 22, all are housed in a process control unit 24 which may be positioned remotely from the weighing scale component containing the Wheatstone bridge.

The bending beam 26 is formed of an elongated resilient member, such as spring steel. The resistors 10, 12, 14 and 16, substantially matched in resistance values, are bonded to the beam inwardly of the opposite ends thereof. They are arranged in pairs, one pair adjacent each end of the beam, with the resistors of each pair being located opposite each other on opposite faces of the beams, to provide electric signals representing forces of tension and compression. Thus, as explained more fully hereinafter, resistors 10 and 12 provide electric signals representing forces of tension and compression, respectively, at one end of the beam, while resistors 14 and 16 provide electric signals representing forces of compression and tension, respectively, at the opposite end of the beam.

A pair of notches 28 are formed in the beam adjacent the resistors. They serve to narrow the width of the beam to approximately that of the resistors. It is by this means that the effects of torsion forces imposed on the bending beam during operation of the scale, are minimized, as explained hereinafter.

It is an important feature of this invention that means is provided for concentrating the stresses and achieving substantially the same magnitudes of tension and compression near the opposite ends of the bending beam, during bending. For this purpose, a flexure strap is provided in the form of an elongated, thin, resilient blade 30, reinforced intermediate its ends by one or more substantially rigid plates 32, there being two such plates illustrated, secured to the blade as by rivets 34. When a load is applied, the strap is tensioned and beam 26 takes on an "S" shape. This concentrates the stresses near the ends of the beam. This concentration is further enhanced by the notches 28.

The bending beam and flexure strap are supported in spaced-apart relationship, preferably substantially parallel to each other, by a pair of cantilever blocks 36 and 38. These blocks are secured to the opposite ends of the beam and strap, as by screws 40. The preferred parallel arrangement forms with the cantilever blocks a parallelogram configuration which provides functions described more fully hereinafter.

It is to be noted that the reinforcing plates 32 terminate inwardly of the inner ends of the cantilever blocks, exposing opposite end portions of the resilient blade 30 between the plates 32 and blocks, for flexing during bending of the beam 26. It is the flexing of the strap 30, 32 that produces substantially the same magnitude of tension and compression at the opposite ends of the bending beam in the areas of the strain sensing resistors.

In the preferred embodiment illustrated, means is provided for sealing the beam assembly hermetically to prevent the entrance of air and moisture. To this end, a sleeve 42 of moisture resistant material encloses the beam and strap assembly. It is sealed at its opposite ends to the cantilever blocks, between a sealing mastic 44 contained in annular grooves 46 in the blocks, and clamping bands 48 which encircle the sleeve and press it against the mastic.

The material of which the sleeve 42 is made must be freely flexible, that is it must not be self-supporting. Exemplary of such materials is latex rubber of the type utilized as surgical drain tubing. It is by virtue of the freely flexible property of the sleeve material that it does not contribute stiffness to the bending beam assembly and therefore does not introduce errors into beam deflection.

Electrical conductors interconnect the resistors to form the balanced Wheatstone bridge referred to hereinbefore. These electrical conductors are extended outward through a hole 50 in cantilever block 36, in the form of an elongated cable 52, for connection to the electrical circuitry of the control unit 24.

The outer end portion of cantilever block 36 is secured to a base member 54 of the weighing scale, as by screws 56. A clamp bar 58 on this block overlies the cable 52 and both are contained in a groove 60 in a filling cast into one end of the base member. The bar 58 thus presses the cable against the bottom of the groove to secure the cable frictionally between them. This prevents tearing the electrical conductors from the resistors by inadvertent pulling on the cable.

A friction pad 62 of rubber or other suitable material is bonded to the underside of the base member 54 to maintain the scale in desired position on the food receiving platform of a food slicer or other processor.

The bending beam assembly slopes angularly upward from the cantilever block 36, so that the opposite block 38 is elevated slightly above the base member 54. A food receiving platform 64 overlies and is secured to the cantilever block 38, as by screws 66.

The base member 54 has an upwardly projecting peripheral wall 54' and food receiving platform 64 has a downwardly projecting peripheral wall 64' which overlaps the base wall 54' and thus inhibits entry of foreign matter into the base. A notch 68 in the wall 64' accommodates the cable 52 extending outwardly from the base member.

The mounting of cantilever block 36 on the base member 54 and the configuration of the upper platform mounting surface of cantilever block 38 are such that the plane of platform 64 is substantially parallel to the plane of base member 54. Further, the preferred parallelogram configuration of the beam and strap assembly maintains the platform 64 substantially horizontal throughout its vertical movement over the full range of scale operation.

Means is provided for limiting the range of vertical movement of platform 64, to prevent damage to the beam assembly and control circuitry. In the embodiment illustrated, an upstanding post 70 on the base member 54 underlies the cantilever block 38 for abutment by the latter to limit its movement toward the base member. The spacing between the post and block 38 may be adjusted, as by means of one or more spacer shims 72 placed atop the post and secured by nut 74. The block 38 abuts this nut which thus establishes the limit of downward movement of the platform.

The nut 74 is threaded onto the threaded shank 76 of a screw. The shank is threaded into a threaded bore in post 70 and extends upward freely through an opening 78 in the cantilever block 38. The upper end of the shank is provided with an enlarged head 80 which is confined in a recess 82 in the block 38. Abutment of the bottom of the recess against the head 80 limits upward movement of the block, and hence platform 64, away from the base member 54. The screw head may be adjusted vertically relative to the cantilever block 38, by the threaded engagement of the screw shank 76 in the threaded bore in post 70. The nut 74 serves the added function of a lock nut to prevent rotation of the screw shaft from the adjusted position of the head 80.

In the preferred embodiment illustrated, wherein the scale is employed to receive slices of meat or other foods from an electrically operated slicer, a food receiving tray 84 is provided to removably overlie the platform 64. The tray has a peripheral wall 84' extending downward therefrom. It is shaped to match the peripheral wall 64' and to overlap the latter, for positioning the tray removably on the platform. An upwardly sloping, curved portion 84" of the tray is contoured to enter the space underlying the cutter of the slicer, to insure that all slices of food are deposited on the tray. It is this contoured tray that accommodates the weighing scale to all known makes and models of food slicers. When the desired weight of food slices is deposited on the tray, the latter may be removed from the platform 64, to transfer the food slices to a plate, to sandwich bread, or for other use.

It is to be noted that the vertical height of the weighing scale component, from the bottom of pad 62 to the top surface of the tray 84, is about one and one-half inch. This enables it to be mounted directly upon the food receiving platform of most makes and models of manual and automatic food slicers, in position to receive slices of meat or other foods as they fall by gravity from the slicing operation.

Even if slices of food fall onto random areas of the platform 64 or tray 84, accurate weight measurements still are achieved because the notches 28 in the bending beam afford maximum accuracy of placement of the resistors in precisely located pairs. This results in cancellation of errors due to twisting of the beam 26 by torsional loading of the platform 64. The flexure strap 30, 32 also assists by minimizing such torsional forces.

Placement of the resistors in registering pairs on opposing faces of bending beam 26 adjacent the opposite ends of the beam, and securing the flexure strap 30, 32 in spaced-apart relationship thereto, results in the portions of the bending beam in which the resistors are located, being strained to substantially equal magnitudes. This increases the sensitivity of the scale to such extent that it is capable of measuring loads as small as 0.1 ounce, with a high degree of reproducible precision over a long period of use.

The flexure strap also serves the important function of dampening the oscillations of the bending beam 26 following the impact of a food slice or other load dropping onto the platform 64 or tray 84. This results in the attainment of stable output voltage signals from the bridge 18 in a minimum of time. This correspondingly decreases the time between the impact of the food slices on the platform and the digital read-out of the weight and the deactivation of the slicer.

In describing the operation of the weighing scale, let it be assumed that the scale is positioned on the receiving platform of an electrically operated food slicer 22' for receiving slices of meat or other food product dropped by gravity during operation of the slicer. Let it also be assumed that the electric circuit of the Wheatstone bridge 18 is connected to a digital read-out unit 20 for indicating the weight of food slices deposited on the receiving platform 64 or tray 84, and that the circuit also is connected to an electric controller 22 by which the slicer is turned off when a predetermined weight of food slices have been cut and deposited on the scale.

As slices of food drop onto the receiving platform 64 or tray 84, the bending beam 26 is bent in such manner that resistors 10 and 16 are placed in tension and resistors 12 and 14 are placed in compression. The degree of imbalance of the Wheatstone bridge 18 is reflected in a proportionate output voltage signal. This signal is applied, after appropriate amplification, to the digital read-out unit 20 to produce a corresponding indication of the weight of food slices thus deposited on the scale. When the desired weight of food slices have been deposited, the corresponding output signal from the bridge 18 actuates the slicer controller 22 automatically to turn off the slicer.

It will be understood that the weighing scale described hereinbefore may be used with a manually operated slicer or other food processor. In such event, the operator merely views the digital read-out unit and stops cutting and depositing the food on the scale when the desired weight has been achieved.

It will be apparent to those skilled in the art that various changes may be made in the size, shape, type, number and arrangement of parts described hereinbefore, without departing from the spirit of this invention and the scope of the appended claims.

Having thus described our invention and the manner in which it may be used, we claim:

1. A load weighing scale comprising:
   (a) an elongated bending beam,
   (b) an elongated flexure strap,
   (c) a pair of horizontally spaced apart cantilever blocks secured to the opposite ends of the bending beam and flexure strap and supporting said beam and strap in vertically spaced-apart relationship,
   (d) first and second pairs of substantially matched strain sensing resistors bonded to the opposite faces of the bending beam adjacent the opposite ends of the beam and connected together electrically to form a balanced Wheatstone bridge,
   (e) a scale base member,
   (f) a scale load receiving member,
   (g) means for securing one of the cantilever blocks to the base member with the bending beam and flexure strap extending angularly upward therefrom, and
   (h) means for securing the other cantilever block to the load receiving member for supporting the latter for movement toward and away from the base member.

2. The load weighing scale of claim 1 wherein the width of the bending beam in the areas of the strain sensing resistors is reduced to approximately the same width as the corresponding width of said resistors.

3. The load weighing scale of claim 1 wherein the bending beam is of substantially uniform thickness and flexure and the flexure strap is provided with resilient end portions adjacent and inwardly of the cantilever blocks and a substantially rigid intermediate portion between the resilient end portions.

4. The load weighing scale of claim 1 including a sleeve of freely flexible, moisture resistant material enclosing the bending beam and strap assembly and sealed at its opposite ends to the cantilever blocks inwardly of the base and load receiving members.

5. The load weighing scale of claim 1 including stop means on the base member arranged for engagement by the cantilever block supporting the load receiving member for limiting movement of the latter in the direction toward and away from the base member, the stop means comprising a post on the base member underlying the cantilever block supporting the load receiving member, a threaded screw shaft extending upwardly from the post freely through an opening in the cantilever block, the screw shaft being threaded into a threaded bore in the post and having an enlarged head at its upper end arranged for abutment by the cantilever block for limiting movement of the latter in the direction away from the base member, and a stop nut on the threaded screw shaft adjustable along the length of the latter and disposed for abutment by the cantilever block for limiting movement of the latter in the direction toward the base member.

6. The load weighing scale of claim 1 wherein:
(a) the width of the bending beam in the areas of the strain sensing resistors is approximately the same as the corresponding width of said resistors,
(b) the bending beam is of substantially uniform thickness and flexure and the flexure strap is provided with resilient end portions adjacent and inwardly of the cantilever blocks and a substantially rigid intermediate portion between the resilient end portions,
(c) a sleeve of freely flexible, moisture resistant material encloses the beam and strap assembly and is sealed at its opposite ends to the cantilever blocks, and
(d) said other cantilever block is spaced above the base member a distance only slightly greater than the load deflecting range of movement of said cantilever block, whereby to minimize the vertical height of the scale.

7. The load weighing scale of claim 1 wherein said other cantilever block is spaced above the base member a distance only slightly greater than the load deflecting range of movement of said cantilever block, whereby to minimize the vertical height of the scale.

8. The load weighing scale of claim 1 wherein the bending beam and flexure strap are substantially parallel to each other, the bottom surface of the one cantilever block is secured to the base member and the top surface of the other cantilever block is secured to the load receiving member, said surfaces being substantially parallel to each other and disposed in planes which extend at a slight angle to the longitudinal dimension of the bending beam and flexure strap, whereby the load receiving member is spaced above the base member a distance only slightly greater than the load deflecting range of movement of the load receiving member.

* * * * *